Figure 1:
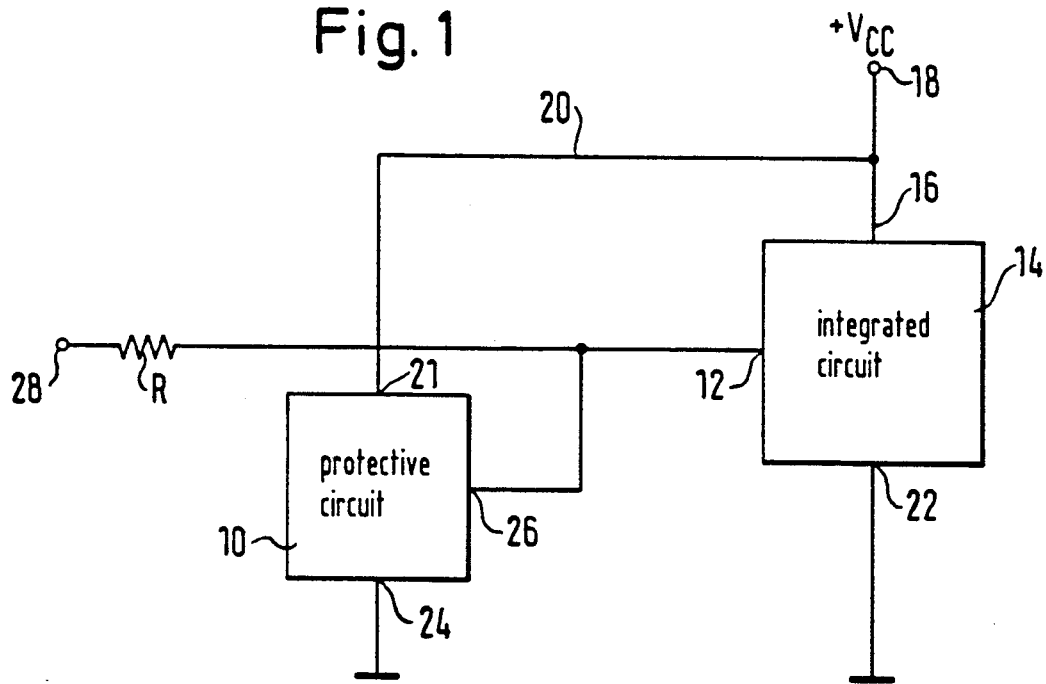

United States Patent [19]

Gotz

[11] Patent Number: 5,157,571
[45] Date of Patent: Oct. 20, 1992

[54] CIRCUIT ARRANGEMENT FOR PROTECTING AN INPUT OF AN INTEGRATED CIRCUIT FED FROM A SUPPLY VOLTAGE SOURCE FROM OVERVOLTAGES

[75] Inventor: Laszlo Gotz, Freising, Fed. Rep. of Germany

[73] Assignee: Texas Instruments Deutschland GmbH, Fed. Rep. of Germany

[21] Appl. No.: 651,162

[22] Filed: Feb. 6, 1991

[30] Foreign Application Priority Data

Feb. 14, 1990 [DE] Fed. Rep. of Germany ....... 4004526

[51] Int. Cl.$^5$ .............................................. H02H 9/04
[52] U.S. Cl. ....................................... 361/54; 361/18; 361/56; 361/91
[58] Field of Search .................... 361/54, 56, 91, 18

[56] References Cited

U.S. PATENT DOCUMENTS

| | | | |
|---|---|---|---|
| 4,686,602 | 8/1987 | Bucksch | 361/91 |
| 4,691,262 | 9/1987 | Chalfin | 361/56 |
| 4,698,720 | 10/1987 | Finaurini | 361/91 |
| 4,704,654 | 11/1987 | Aberle et al. | 361/91 |
| 4,868,705 | 9/1989 | Shiochi et al. | 361/91 |
| 4,939,616 | 7/1990 | Roontree | 361/91 |
| 5,012,317 | 4/1991 | Rountre | 361/56 |
| 5,027,181 | 6/1991 | Larik et al. | 361/56 |

FOREIGN PATENT DOCUMENTS 2095909 10/1982 United Kingdom ................. 361/91

OTHER PUBLICATIONS

IBM Technical Disclosure Bulletin, vol. 15, No. 9 Feb. 1973, "Protective Circuit" by K. Helwig et al.

Primary Examiner—Steven L. Stephan
Assistant Examiner—Thomas M. Dougherty
Attorney, Agent, or Firm—William E. Hiller; Richard L. Donaldson

[57] ABSTRACT

A circuit arrangement for protecting an input of an integrated circuit (14) fed from a supply voltage source from overvoltages contains an input (26) which is connected to the input (12) of the integrated circuit to be protected. A four-layer diode (T1, T2) having two control terminals lies in parallel with the input (12) to be protected and a negative feedback resistor (R1) is connected in series with the four-layer diode. Connected to the one control terminal of the four-layer diode (T1, T2) is the control terminal of a controllable current drain element (T4) which is connected in parallel with the four-layer diode (T1, T2). For applying a reference voltage, the junction point of a series circuit comprising a diode (T3) and a constant current source (S) lying between the supply voltage and ground is connected to the other control terminal.

5 Claims, 1 Drawing Sheet

CIRCUIT ARRANGEMENT FOR PROTECTING AN INPUT OF AN INTEGRATED CIRCUIT FED FROM A SUPPLY VOLTAGE SOURCE FROM OVERVOLTAGES

The invention relates to a circuit arrangement for protecting an input of an integrated circuit fed from a supply voltage source from overvoltages, comprising an input which is connected to the input of the integrated circuit to be protected.

Integrated circuits, in particular those having MOS components, are very sensitive to overvoltages at the input terminals. For protecting such circuits zener diodes can be connected to the input terminals, said diodes becoming conductive as soon as their zener voltage is exceeded. The zener voltage is selected so that it is equal to the supply voltage of the integrated circuit to be protected. It is possible in this manner to prevent a voltage greater than the supply voltage from reaching the input of the integrated circuit to be protected. The use of a zener diode as protective element however has the disadvantage that the zener voltage is fixed and does not change when the supply voltage of the integrated circuit to be protected fluctuates. If for example it is assumed that the supply voltage of the integrated circuit is 5 V then to the input to be protected a zener diode with a zener diode voltage also of 5 V is connected. If in this case the supply voltage drops for example to 4.5 V the zener voltage remains unchanged at 5 V so that the case can occur where the voltage at the input to be protected is greater than the supply voltage. Since as a rule in such a case integrated circuits behave in uncontrolled manner or are even destroyed, a protective circuit containing a zener diode as protective element is not suitable for all uses. Moreover, a zener diode is temperature-sensitive as regards the value of its zener voltage so that on temperature fluctuations the protection mechanism no longer functions in the desired manner.

The invention is based on the problem of providing a circuit arrangement of the type indicated at the beginning with the aid of which inputs of integrated circuits can be reliably protected even with fluctuating supply voltages and varying temperatures.

This problem is solved according to the invention in that parallel to the input to be protected a four-layer diode having two control terminals is connected and in series therewith a negative feedback resistor, that to one control terminal a control terminal of a controllable current drain element is connected which is connected in parallel with the four-layer diode and that the junction point of a series circuit of a diode and a constant current source lying between the supply voltage source and ground is connected to the other control terminal of the four-layer diode for applying a reference voltage.

With the circuit arrangement according to the invention it is achieved that the voltage at which the protective mechanism becomes effective is automatically adapted to the particular supply voltage in that a reference voltage derived from the supply voltage is used. By making the circuit arrangement in the form of an integrated circuit the components can be so dimensioned that they have the same temperature behaviour, the circuit chosen achieving compensation of the temperature influences, said circuit arrangement thus having its intended effect irrespective of temperature fluctuations.

Advantageous further developments of the invention are characterized in the subsidiary claims.

Figure 2:
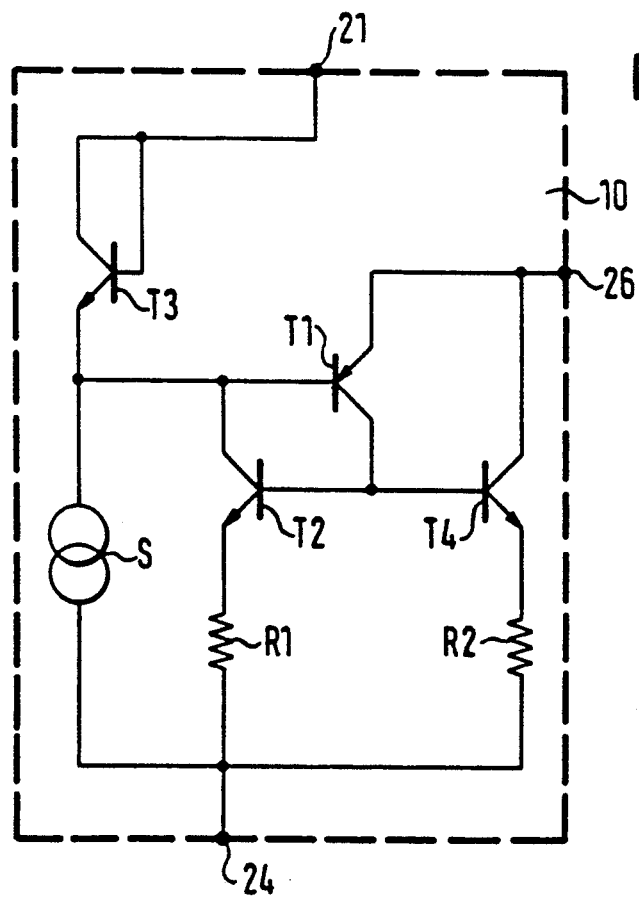

The invention will now be explained by way of example with the aid of the drawings, wherein:

FIG. 1 shows a block circuit diagram which illustrates the use of the circuit arrangement according to the invention and FIG. 2 shows an exact circuit diagram of the circuit arrangement according to the invention.

The circuit arrangement illustrated as block in FIG. 1 forms a protective circuit 10 with the aid of which the input 12 of an integrated circuit 14 can be protected from overvoltages. The integrated circuit 14 is connected via a line 16 to a connection terminal 18 which in turn is connected to a supply voltage source furnishing the supply voltage $V_{CC}$. Via a line 20 the supply voltage is also applied to the terminal 21 of the protective circuit 10. The terminal 22 of the integrated circuit 12 and the terminal 24 of the protective circuit 10 are applied to ground. A terminal 26 of the protective circuit 10 is connected to the input 12 of the integrated circuit 14. The input signal which is to be supplied to the integrated circuit 14 is supplied to an input 28, a resistor R being disposed between said input 28 and the input 12.

The protective circuit 10 is so configured that whenever a voltage greater than the supply voltage $V_{CC}$ applied to the terminal 18 occurs at the input 12 of the integrated circuit 14 the protective circuit 10 between the terminal 26 and ground assumes a low impedance which ensures that the voltage at the input 12 is held at the value of the supply voltage $V_{CC}$.

The exact structure of the protective circuit 10 can be seen from the circuit diagram of FIG. 2.

As central component the protective circuit 10 contains a four-layer diode which is made up of a PNP transistor T1 and an NPN transistor T2. The manner in which four-layer diodes of this type work is explained for example in the journal "Elektro-Technik", No. 4, Feb. 2, 1966, page 60. If a voltage which is greater than the voltage at the base of the transistor T1 is applied to said four-layer diode consisting of the two transistors T1 and T2, in the circuit diagram of FIG. 2 between the terminal 26 and ground, the current through the four-layer diode increases abruptly and this means that the diode goes into the forward conductive state. When the voltage drops the diode returns to the nonconductive state when the current flowing therethrough drops below a predetermined hold current value. The negative feedback resistor R1 in the emitter line of the transistor T2 limits the current flowing through the four-layer diode.

In the circuit of FIG. 2, with the aid of a series circuit comprising an NPN transistor T3 and a constant current source S a reference voltage is generated at the base of the transistor T1 and defines the voltage value at which the four-layer diode comprising the transistors T1 and T2 goes into the conductive state. The transistor T3 is connected as diode by connecting its base to its collector. The base of the transistor T1 is connected to the emitter of this transistor T3 connected as diode. The constant current source S is so configured that it furnishes exactly the current which keeps the four-layer diode comprising the transistors T1 and T2 in the conductive state. Between the terminal 26 and the terminal 24 there is a series circuit comprising an NPN transistor T4 and a resistor R2, said series circuit being in parallel with the transistors T1 and T2 and the negative feedback resistor R1.

The protective circuit 10 illustrated in FIG. 2 behaves as follows:

Assuming that the supply voltage $V_{CC}$ is applied to the terminal 21, the voltage value $$V_{Ref} = V_{BE(T3)}$$

occurs as reference voltage at the base of the transistor T1. $V_{BE(T3)}$ is the basis emitter voltage of the transistor T3. As soon as the voltage at the terminal 26 becomes greater than the reference voltage at the base of the transistor T1 the four-layer diode comprising the transistors T1 and T2 becomes conductive and the current flowing therethrough rises abruptly. The current rise is limited by the negative feedback resistor R1 and with increasing current an increasingly large voltage drop would occur across this resistor and would prevent the current resulting from an overvoltage at the terminal 26 flowing away. Thus, without taking additional steps the desired protective action would not be obtained. However, due to the current through the negative feedback resistor R1 the transistor T4 also becomes conductive so that it takes over part of the current which would otherwise have to flow through the transistors T1 and T2. The value of the negative feedback resistor R1 is substantially greater than the value of the resistor R2 and consequently the greater part of the current after the four-layer diode becomes conductive flows away via the transistor T4 from the terminal 26 to ground. The only current then flowing through the four-layer diode is the current which keeps it in the conductive state and consequently the protective mechanism remains effective as long as an overvoltage is present at the terminal 26. Due to the conductive state of the four-layer diode the protective circuit 10 can respond very rapidly to voltage peaks and consequently an effective protection of the input of the integrated circuit 12 connected to the terminal 26 is in fact achieved.

In practice the constant current voltage S supplying in the ideal case a current equal to the hold current of the four-layer diode is formed by a very high value resistance.

When the protective circuit 10 is made as part of an integrated circuit the transistor T1 and the transistor T3 are made in the same production steps and under the same conditions so that said two transistors have a completely identical temperature behaviour. As a result, the response threshold of the protective circuit remains uninfluenced by temperature fluctuations because the voltage-dependent base-emitter voltage of the two transistors is present both between the base of the transistor T1 and the terminal 26 on the one hand and the terminal 21 fed by the supply voltage $V_{CC}$ on the other hand and consequently the difference between the supply voltage $V_{CC}$ and the voltage at the terminal 26, which is decisive for the response of the protective circuit, remains constant irrespective of the particular temperature.

The circuit arrangement described protects the input 12 of the integrated circuit from positive overvoltages, i.e. voltages greater than the supply voltage $V_{CC}$. It is readily possible also to extend the circuit so that it provides protection from negative overvoltage as well. For this purpose the circuit of FIG. 2 need only be amplified by a laterally inverted replica in which the transistors are each replaced by transistors of the opposite conductivity type. The circuit is then symmetrical in potential as regards the terminal 26 so that a protection is obtained both from positive and from negative over-voltages. The exact configuration of this amplification will be readily apparent to the expert and thus need not be explained in detail.

I claim:

1. A protective circuit for protecting an input of an integrated circuit from overvoltages, wherein a supply voltage source provides a supply voltage to a second input of the integrated circuit, said protective circuit comprising:
    an input terminal for connection to the input of the integrated circuit to be protected;
    a four-layer diode;
    a reference node for connection to ground;
    said four-layer diode being connected between said input terminal and said reference node;
    a negative feedback resistor connected in series between said four-layer diode and said reference node;
    said four-layer diode having first and second control terminals;
    a controllable current drain element having a control terminal connected to said first control terminal of said four-layer diode for connecting said controllable current drain element in parallel with said four-layer diode between said input terminal and said reference node;
    a diode for connection to the supply voltage source;
    a constant current source connected to said diode in series;
    said diode and said constant current source connected between a node for said supply voltage source and said reference node;
    a junction node between said diode and said constant current source connected to said second control terminal of said four-layer diode for applying a reference voltage thereto;
    the reference voltage as applied to sid second control terminal of said four-layer diode being derived form the supply voltage and defining the voltage value at which said four-layer diode becomes conductive; and
    said controllable current drain element becoming conductive in response to current through said negative feedback resistor to assume a portion of the current which would otherwise flow through said four-layer diode so as to limit the current flowing through said four-layer diode to the current which continues its conductive state.

2. A protective circuit as set forth in claim 1, wherein said controllable current drain element comprises a bipolar transistor having base, emitter and collector electrodes;
    the base electrode of said bipolar transistor comprising the control terminal connected to said first control terminal of said four-layer diode, and the collector-emitter path of said bipolar transistor being disposed in the connection between said input terminal and said reference node.

3. A protective circuit as set forth in claim 2, further including a second resistor connected to the emitter electrode of said bipolar transistor comprising sid controllable current drain element;
    said second resistor having a value substantially less than the value of said negative feedback resistor.

4. A protective circuit as set forth in claim 3, wherein said diode comprises a second bipolar transistor having base, collector and emitter electrodes;

the collector and base electrodes of said second bipolar transistor being connected for joint connection to the supply voltage source and the emitter electrode of said second bipolar transistor being connected to said second control terminal of said four-layer diode via said junction node.

5. A protective circuit as set forth in claim 4, wherein said four-layer diode comprises first and second bipolar transistors of opposite polarity types;

said first and second bipolar transistors of said four-layer diode respectively including base, collector and emitter electrodes;

the respective base electrodes of said first and second bipolar transistors of said four-layer diode comprising said first control terminal and said second control terminal of said four-layer diode;

the collector electrode of said first bipolar transistor of said four-layer diode being connected to a junction between said second control terminal of said four-layer diode as defined by the base electrode of said second bipolar transistor and said junction node between said diode and said constant current source, and said emitter electrode of said first bipolar transistor being connected to said negative feedback resistor; and the emitter electrode of said second bipolar transistor of said four-layer diode being connected to said input terminal and the collector electrode being connected to a junction between said first control terminal of said first bipolar transistor as defined by the base electrode thereof and said control terminal of said controllable current drain element.

* * * * *